Nov. 2, 1954

H. L. PENBERTHY 2,693,498

ELECTRODE ASSEMBLY FOR GLASS FURNACES

Filed Aug. 3, 1953

INVENTOR
HARVEY L. PENBERTHY

BY Strauch, Nolan & Diggins

ATTORNEYS

United States Patent Office 2,693,498
Patented Nov. 2, 1954

2,693,498

ELECTRODE ASSEMBLY FOR GLASS FURNACES

Harvey L. Penberthy, Seattle, Wash.

Application August 3, 1953, Serial No. 371,858

9 Claims. (Cl. 13—17)

This invention relates to glass furnaces and more particularly to a novel arrangement for mounting and feeding electrodes into such furnaces.

In the operation of glass furnaces, that end of the electrode which is immersed in the molten glass is at a very elevated temperature in relation to the other end, which protrudes from the furnace into ambient air. Since practical electrodes for use in glass furnaces oxidize under such conditions where the exposed portion is at an excessive temperature, it has been customary to provide a closed jacket around at least a portion of electrode through which a coolant, such as water, is flowed to prevent excessively rapid oxidation.

According to this invention there is provided a molybdenum electrode extending through a relatively loose fitting bushing into the glass furnace. Around such electrode is provided an open conduit into which a cooling fluid is fed to impinge directly upon the bushing and electrode and thereby cool the same. It has been found that the molybdenum oxide film which forms on the air exposed portions of the electrode is a protective coating up to approximately 1100° F. and it is therefore only necessary to cool the air exposed portion of the electrode to a temperature of 1000° F. or lower. Because it is unnecessary to cool the electrode below this relatively high temperature and because a certain amount of the latent heat of vaporization of a liquid coolant is utilized in addition to its heat transfer abilities the amount of cooling liquid which it is necessary to supply to the electrode is relatively small and there is no necessity for forming a water-tight liquid enclosure around the electrode. In addition to using liquid coolant it has also been found that gaseous coolants such as air may be used which further minimizes the problem of disposing of the spent coolant.

Various methods have been utilized in previous practice in order to provide for electrode replacement, some methods necessitating a complete shut-down of the furnace. According to the method of the present invention provision is made for axially feeding successive electrodes into the furnace in such a manner as to allow continuous operation while providing for the most efficient use of the electrode material.

It is accordingly a primary object of this invention to provide an electrode structure for feeding a molybdenum electrode to a glass furnace while cooling such electrode to prevent excessively rapid deterioration.

It is another object of this invention to provide such an electrode structure wherein the amount of liquid coolant used is relatively small.

It is a further object of the invention to provide such an electrode structure wherein there is no necessity for providing water-tight seals around the electrode.

It is a still further object of the invention to provide an electrode arrangement wherein successive electrodes may be fed to the furnace with a minimum of labor and with a minimum of spent electrode wastage.

Further objects and advantages of the invention will become clear upon reference to the following description and drawings wherein.

Figure 1:
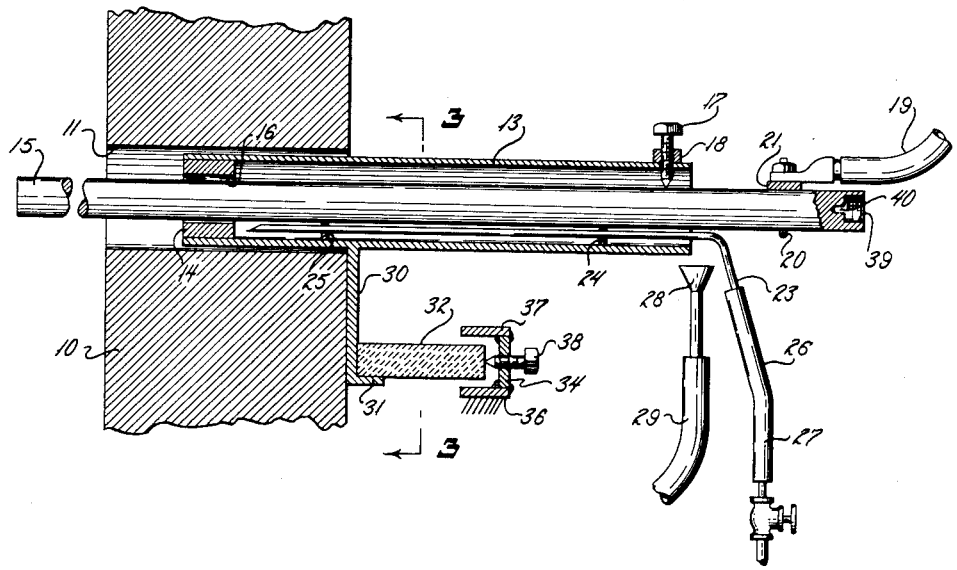
Figure 1 is a cross section in elevation of a wall of a glass furnace having mounted therein an electrode assembly according to this invention.

Referring more particularly to the figures of the drawings there is shown in Figure 1 a tank block 10 having an aperture 11 therein to receive an electrode assembly shown generally at 12. The electrode assembly 12 consists of a sleeve 13 which may be of any suitable metal, such as steel, in which there is mounted at one end thereof a bushing 14 of any suitable material such as steel. Extending axially through the sleeve 13 is a molybdenum electrode 15 which passes slidably through an aperture 16 in the bushing 14. It has been discovered that if the bushing 14 is retracted from the inner wall of the tank block 10, the cooling requirements are considerably reduced. It has been found that when the bushing is so located the glass which enters the aperture 11 and contacts the bushing 14 is at a temperature substantially below the temperature of the glass in the tank. The cooling necessary to protect the air exposed portion of the electrode may be further reduced by using a bushing 14 having a substantial length in relation to the thickness of the tank block 10, in that such a bushing acts as a partial insulator between the glass in contact with one surface thereof and the coolant in contact with the other surface. At the oposite end of sleeve 13 from the bushing 16 are found a plurality of set screws 17 mounted in nuts 18 which may be welded to the sleeve 13 at appropriate locations, such as at 120° spaced locations around the periphery of the sleeve. A supply of electrical current to the electrode 15 is provided through a power cable 19 which is connected to the electrode by means of a U-bolt 20, strap 21 and pair of nuts 22.

Extending into sleeve 13 is a coolant feed tube 23 which may merely lie upon the bottom of sleeve 13 or may be supported therein by means of a pair of apertured brackets 24 and 25 fastened within the sleeve by any suitable means such as by welding. The tube 23 receives a supply of coolant liquid from any suitable source such as through a flexible tube 26 and valve 27. A discharge for liquid coolant is provided in the form of a funnel 28 which is connected to a suitable discharge line such as the tube 29. As an alternative to the use of a single coolant feed tube it has been found that in certain installations a plurality of such tubes may be used in such a manner as to direct the coolant around the electrode and bushing to secure the most efficient cooling with a minimum of fluid.

The electrode assembly 12 is maintained in position against the pressure of the molten glass in the furnace by means of a bracket 30 which is radially fastened to the sleeve 13 by any suitable means such as by welding. Bracket 30 has a perpendicular flange 31 at its lower section which supports a refractory block such as a fire brick 32 which is adjustably received in a channel shaped support 33. The support 33 may comprise a strip of metal 34 welded to the conventional jack bolt brace 36 and a strip of metal 37 welded to the strip 34. A cap screw 38 may be provided in the metal strip 34 in order to permit tightening of the electrode assembly into position. Other methods of supporting the brick on the bracket 30 may be used and where the electrode is mounted in the bottom of the furnace gravity will maintain the bracket and brick in the proper positions.

In order to provide for electrode replacement without furnace shut-down and in order to provide for the maximum usage of electrodes there is provided in one end of each molybdenum electrode a threaded bore 39 which has at its inner end a smaller and centrally located pilot bore 40. The other end of each electrode is shaped in such a manner as to mate with this female section and comprises a threaded stud 41 and smaller and centrally disposed pilot stud 42.

In operation the electrode assembly is placed in the aperture in the tank block of the furnace and firmly secured thereto by means of the fire brick 32 and cap screw 38. When the glass charge of the furnace becomes molten a small amount will flow into the space between the bushing 14 and the electrode 15. Because the outer edge of the bushing 14 is at a temperature insufficiently high to maintain the glass in its molten state such glass will freeze around the electrode thereby providing an oxidation seal. Because of the clearance allowed between bushing 14 and electrode 15 the electrode may be easily positioned into the furnace upon loosening of set screws 17. A supply of coolant is fed to the feed tube 23 and this coolant is directed against the bushing 14 and electrode 15 at their juncture and any steam formed escapes through the open end of the sleeve 13 along with the heated water. The heated water along with any condensed steam will be received in the funnel 28 from which it is drained. By regulating the setting of the coolant supply valve 27 it is possible to maintain the air encased portion of the electrode at a temperature below approximately 1000° F. while utilizing only a very small supply of liquid.

Figure 2:
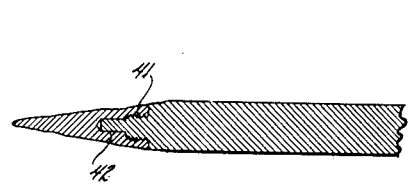
Figure 2 is a cross section of two electrodes joined together according to the invention.
Figure 3:
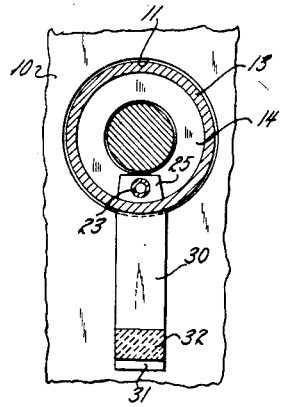
Figure 3 is a cross section taken on the lines 3—3 of Figure 1.

When an electrode is substantially fully consumed, as is shown in Figure 1, electrode replacement may be effected by screwing the male section 41 of a fresh electrode into the threaded female section 39 of the spent electrode whereupon pilot stud 42 will enter the pilot bore 40. As the working end of an electrode is consumed in the molten glass the electrode tip forms an elongated point as is shown in Figure 2. The erosion progresses until a stage is reached where the conical surface of the spent electrode approaches so closely the bottom periphery of the bore 39 that the small thickness of electrode material remaining at this point possesses insufficient strength to support the remaining point of the spent electrode. Where no pilot stud, such as 42, is provided the spent electrode then falls into the molten glass and is wasted. When a pilot stud such as 42 is provided the loss of support due to the erosion of the surface around bore 39 will not cause the spent electrode to fall away since even after the support of the threaded section is gone the pilot stud 42 will support the remaining section of the spent electrode. Over a period of time this method of fitting in the replacement electrodes results in substantial economies.

Whereas this invention has been described in terms of particular apparatus it is to be understood that this has been for the purpose of illustration only and is not to be deemed limiting in any sense, the invention being limited solely by the scope and terms of the appended claims.

I claim:

1. In an electrode assembly in an apertured furnace wall, a sleeve having an end entering said aperture and having an open end, a bushing mounted in said sleeve at the end enclosed in said wall, an electrode extending through said sleeve and said bushing, means in said sleeve for delivering to said bushing and electrode a supply of coolant, and support means holding said sleeve in position.

2. In an electrode assembly in an apertured furnace wall, a sleeve having an end entering said aperture and an open end protruding therefrom, a bushing in said sleeve at the wall enclosed end thereof, an electrode extending through said sleeve and said bushing, means in said sleeve for delivering to said bushing and electrode a supply of coolant, and support means removably holding said sleeve in position in said aperture.

3. In an electrode assembly in an apertured furnace wall, a sleeve having an end entering said aperture and an open end protruding therefrom, a bushing in said sleeve at the wall enclosed end thereof, an electrode extending through said sleeve and said bushing, means in said sleeve for delivering to said bushing and electrode a supply of coolant, and support means removably holding said sleeve in position in said aperture, said support means comprising a bracket perpendicularly attached to said sleeve, and means to secure said bracket to said furnace wall.

4. An assembly as set out in claim 3 wherein said coolant delivering means comprises a tube extending into said sleeve and terminating therein short of said bushing.

5. In an electrode assembly in an apertured furnace wall, a sleeve having an end entering said aperture and an open end protruding therefrom, a bushing mounted in said sleeve at the wall enclosed end thereof, an electrode extending through said sleeve and said bushing, said electrode and said sleeve defining an annular space therebetween, a tube mounted in said sleeve in said annular space, said tube extending along said sleeve over a substantial part of its length, means to supply fluid coolant to said tube, and bracket means attached to said sleeve to maintain said sleeve in postion in said apertured wall.

6. An assembly as set out in claim 5 wherein said bracket means comprises a radial flanged bracket, an insulating block contacting a surface of said bracket facing away from said wall, and support means for holding a second end of said block.

7. In an electrode assembly in an apertured furnace wall, a sleeve having an end entering said aperture and having an open end, a bushing in said sleeve at the end enclosed in said wall, said bushing being retracted from the inner surface of said wall, an electrode extending through said sleeve and said bushing, means in said sleeve for delivering to said bushing and electrode a supply of coolant and support means holding said sleeve in position.

8. An electrode assembly as set forth in claim 7, wherein said bushing is of a substantial axial length in relation to the thickness of said wall.

9. In an electrode assembly in an apertured furnace wall, a sleeve having an end entering said aperture and having an open end, a bushing mounted in said sleeve at the end enclosed in said wall, an electrode extending through said sleeve and said bushing, means in said sleeve for delivering a supply of coolant direct to said bushing and electrode, and support means holding said sleeve in position.

References Cited in the file of this patent

UNITED STATES PATENTS

| Number | Name | Date |
|---|---|---|
| 647,614 | Ruthenburg | Apr. 17, 1900 |
| 855,441 | Becket | June 7, 1907 |
| 863,074 | Tone | Aug. 20, 1907 |
| 932,368 | Becket | Aug. 24, 1909 |
| 1,572,534 | Hinckley | Feb. 9, 1926 |
| 1,615,109 | Coe | Jan. 18, 1927 |
| 1,663,356 | Smith | Mar. 20, 1928 |
| 1,849,123 | Thomson | Mar. 15, 1932 |
| 1,849,510 | Thomson | Mar. 15, 1932 |
| 1,891,539 | Honnors | Dec. 20, 1932 |
| 2,159,361 | Atkinson et al. | May 23, 1939 |
| 2,419,139 | Hopkins | Apr. 15, 1947 |